(12) United States Patent
Anderson et al.

(10) Patent No.: US 7,032,834 B1
(45) Date of Patent: Apr. 25, 2006

(54) FILTERING DEVICE FOR AN IRRIGATION SYSTEM

(76) Inventors: Dale D. Anderson, 30400 Hwy. 34, Wray, CO (US) 80758; Bret Anderson, 527 S. Ash, Wray, CO (US) 80758

(*) Notice: Subject to any disclaimer, the term of this patent is extended or adjusted under 35 U.S.C. 154(b) by 275 days.

(21) Appl. No.: 10/761,999

(22) Filed: Jan. 21, 2004

(51) Int. Cl.
B05B 1/28 (2006.01)
B05B 15/02 (2006.01)
B05B 15/00 (2006.01)

(52) U.S. Cl. ............... 239/104; 239/106; 239/113; 239/542; 239/547

(58) Field of Classification Search ............ 239/104, 239/106, 113, 116, 109, 542, 547, 461, 483; 210/131, 168, 171
See application file for complete search history.

(56) References Cited

U.S. PATENT DOCUMENTS

| | | | |
|---|---|---|---|
| 1,732,071 A | 10/1929 | Shaw | |
| 1,927,228 A | 9/1933 | Crompton | |
| 2,574,865 A | 11/1951 | Edwards | |
| 3,658,251 A | 4/1972 | Wolflin | |
| 3,695,173 A * | 10/1972 | Cox | 100/74 |
| 4,978,450 A | 12/1990 | Drori | |
| 5,015,371 A | 5/1991 | Webb | |
| 5,071,546 A * | 12/1991 | Ruegg | 210/148 |
| 5,234,582 A | 8/1993 | Savoie | |
| 5,423,904 A * | 6/1995 | Dasgupta | 96/146 |
| 5,779,154 A | 7/1998 | Martin | |
| 6,575,307 B1 | 6/2003 | Lockwood | |
| 2001/0025815 A1 | 10/2001 | Schwinghammer | |
| 2002/0079274 A1 | 6/2002 | Tichy | |
| 2003/0121995 A1 | 7/2003 | Akahane et al. | |

* cited by examiner

*Primary Examiner*—Davis Hwu
(74) *Attorney, Agent, or Firm*—Woods Fuller Shultz & Smith PC

(57) ABSTRACT

A filtering system for filtering particles from a flow of fluid is disclosed, and includes a filter device for removably positioning in a lumen of a pipe carrying the flow of fluid. The filter device has an upstream side for positioning in an upstream direction of fluid flow and a downstream side for positioning in a downstream direction of fluid flow. The filter device comprises a perimeter rim extending along the perimeter edge of the filter device and defining an opening, and a plurality of filter bars extending across the opening to form a plurality of slots therebetween. Each of the filter bars of the plurality of filter bars has a transverse cross sectional shape. The transverse cross sectional shape has a transverse width toward the upstream side of the filter device that is relatively wider than the transverse width toward the downstream side of the filter device.

9 Claims, 4 Drawing Sheets

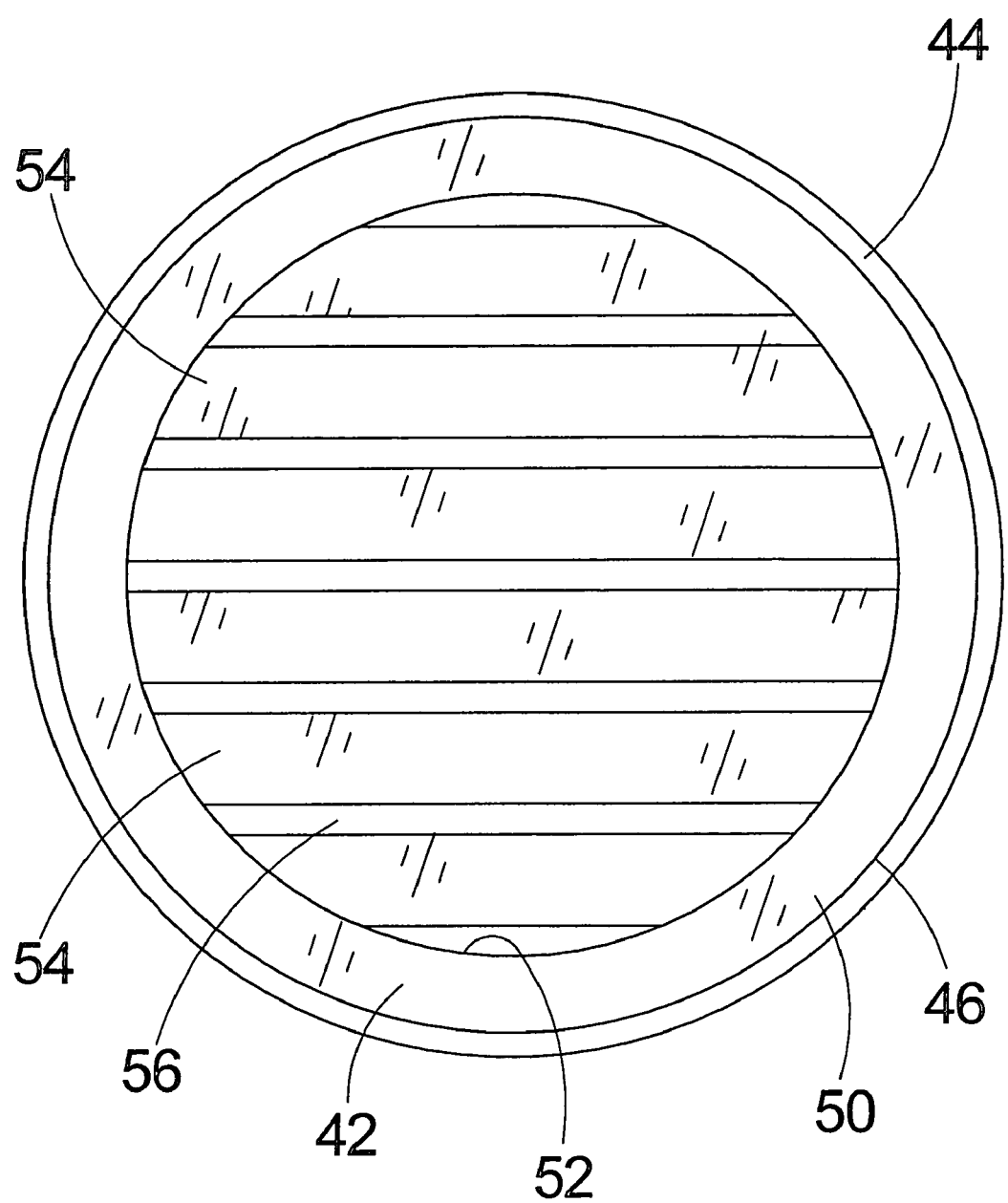

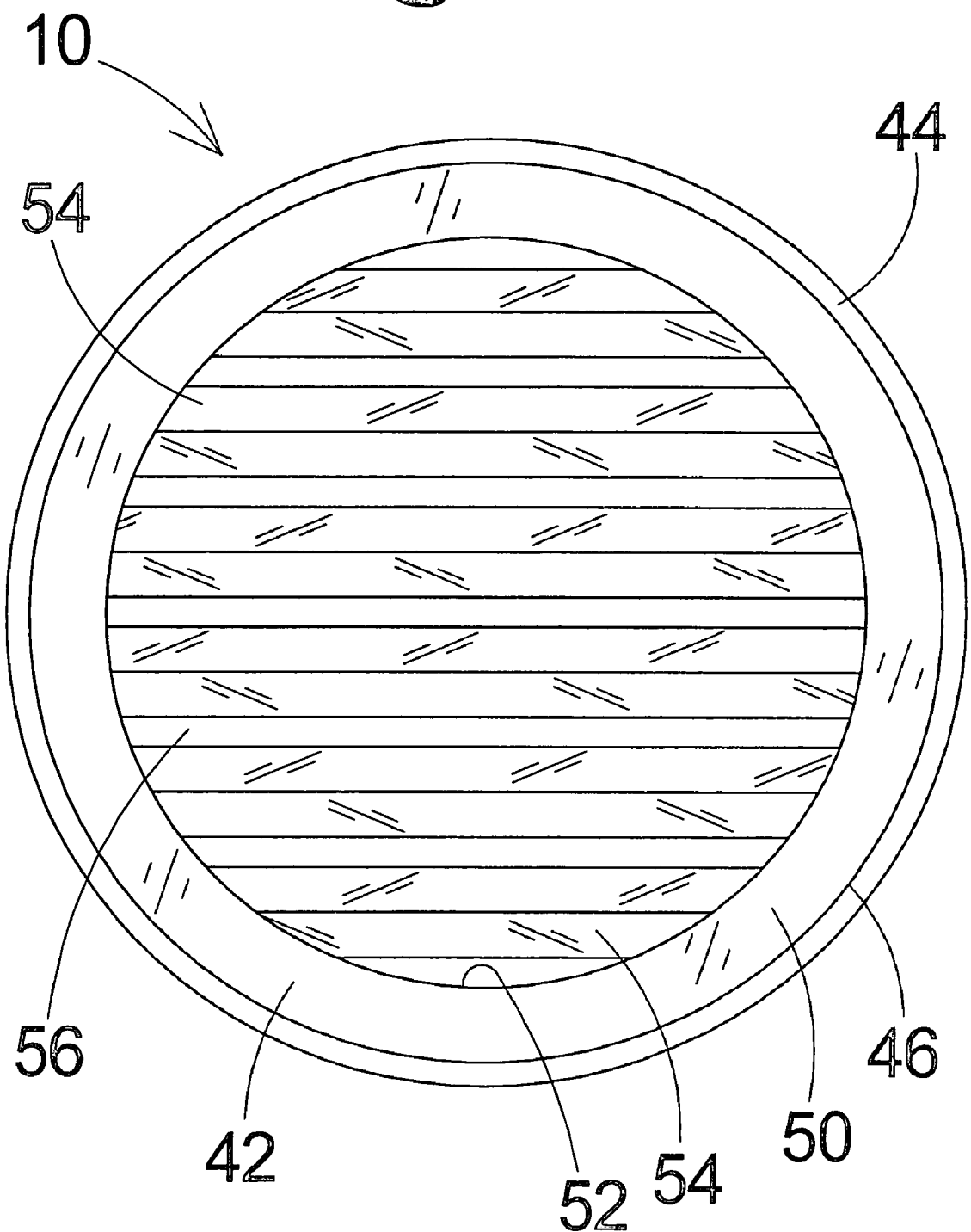

FILTERING DEVICE FOR AN IRRIGATION SYSTEM

BACKGROUND OF THE INVENTION

1. Field of the Invention

The present invention relates to filtering systems and more particularly pertains to a new filtering device for an irrigation system for keeping clogging particles from reaching fluid dispersing orifices.

2. Description of the Prior Art

Irrigation systems, such as those used for watering agricultural crops, often draw water from sources that may include particles that can clog the orifices of sprinkler devices used as part of the irrigation system. The water may be drawn from, for example, sources such as wells, rivers, streams, lakes, ponds, and even animal and human waste lagoons, and the water may contain particles of sand, rust flakes, paint flakes, plant seeds, other plant materials, among other things.

Clogged orifices on the sprinkler heads can be difficult to detect since the sprinkler head is often positioned relatively close to the ground and amongst the plants of the crop, and thus clogged heads can go unnoticed which may cause crop growth to suffer. Even if the clogged orifice is detected, disassembly of the sprinkler from the rest of the water supply system is required to clear the particles from the head.

The problem of clogged irrigation sprinkler orifices has become increasingly significant as newer, more efficient and water conserving methods of water application have been developed that employ greater numbers of sprinkler heads with smaller sprinkler orifice sizes on the sprinkler heads. These factors have not only made the sprinklers more prone to clogging, but also increased the numbers of sprinklers to monitor. Illustratively, a center pivot irrigation system for a quarter section (about 160 acres) of agricultural land may have between about 150 and about 260 sprinkler heads.

A further challenge when employing filtering systems is how to flush or clear the debris that have accumulated in or on the filter on a regular basis so that fluid flow in the irrigation system is not degraded, and thus effectively just transferring the clogging problem from the sprinkler head to the filtering system. This must be accomplished while maintaining the filtering system close enough to the sprinkler head to protect the sprinkler head from debris that is already in the irrigation system.

In these respects, the filtering device for an irrigation system, according to the present invention, substantially departs from the conventional concepts and designs of the prior art, and in so doing provides an apparatus primarily developed for the purpose of keeping clogging particles from reaching fluid dispersing orifices.

SUMMARY OF THE INVENTION

In view of the foregoing disadvantages inherent in the known types of filtering systems now present in the prior art, the present invention provides a new filtering device for an irrigation system wherein the same can be utilized for keeping clogging particles from reaching fluid dispersing orifices of the sprinklers of the irrigation system.

To attain this, the present invention generally comprises a filtering system for filtering particles from a flow of fluid, and includes a filter device for removably positioning in a lumen of a pipe carrying the flow of fluid. The filter device has an upstream side for positioning in an upstream direction of fluid flow and a downstream side for positioning in a downstream direction of fluid flow. The filter device comprises a perimeter rim extending along the perimeter edge of the filter device and defining an opening, and a plurality of filter bars extending across the opening to form a plurality of slots therebetween. Each of the filter bars of the plurality of filter bars has a transverse cross sectional shape. The transverse cross sectional shape has a transverse width toward the upstream side of the filter device that is relatively wider than the transverse width toward the downstream side of the filter device.

In some embodiments of the invention, the transverse cross sectional shape of each of the filter bars has a pair of side surfaces, and the side surfaces of the cross sectional shape converge toward the downstream side of the filter device and diverge toward the upstream side of the filter device.

In some embodiments of the invention, the filter device additionally comprises a thread that is formed on a perimeter edge of the filter device.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

One significant advantage of the present invention is the filter devices permits the collection of potentially clogging particles at a relatively central location before the particles travel farther in the irrigation and reach the orifices of the dispersed irrigation sprinklers, while minimizing the resistance to fluid flow through the system and the resulting pressure loss. In some implementations of the system, the filter device is self-flushing or and self-clearing when the fluid flow is stopped, permitting any particles stopped by the filter device to fall away from the filter device.

Further advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein:

FIG. 3 is a schematic bottom, or upstream, view of the filtering device of the present invention.

FIG. 4 is a schematic top, or downstream, view of the filtering device of the present invention.

DESCRIPTION OF PREFERRED EMBODIMENTS

Figure 1:
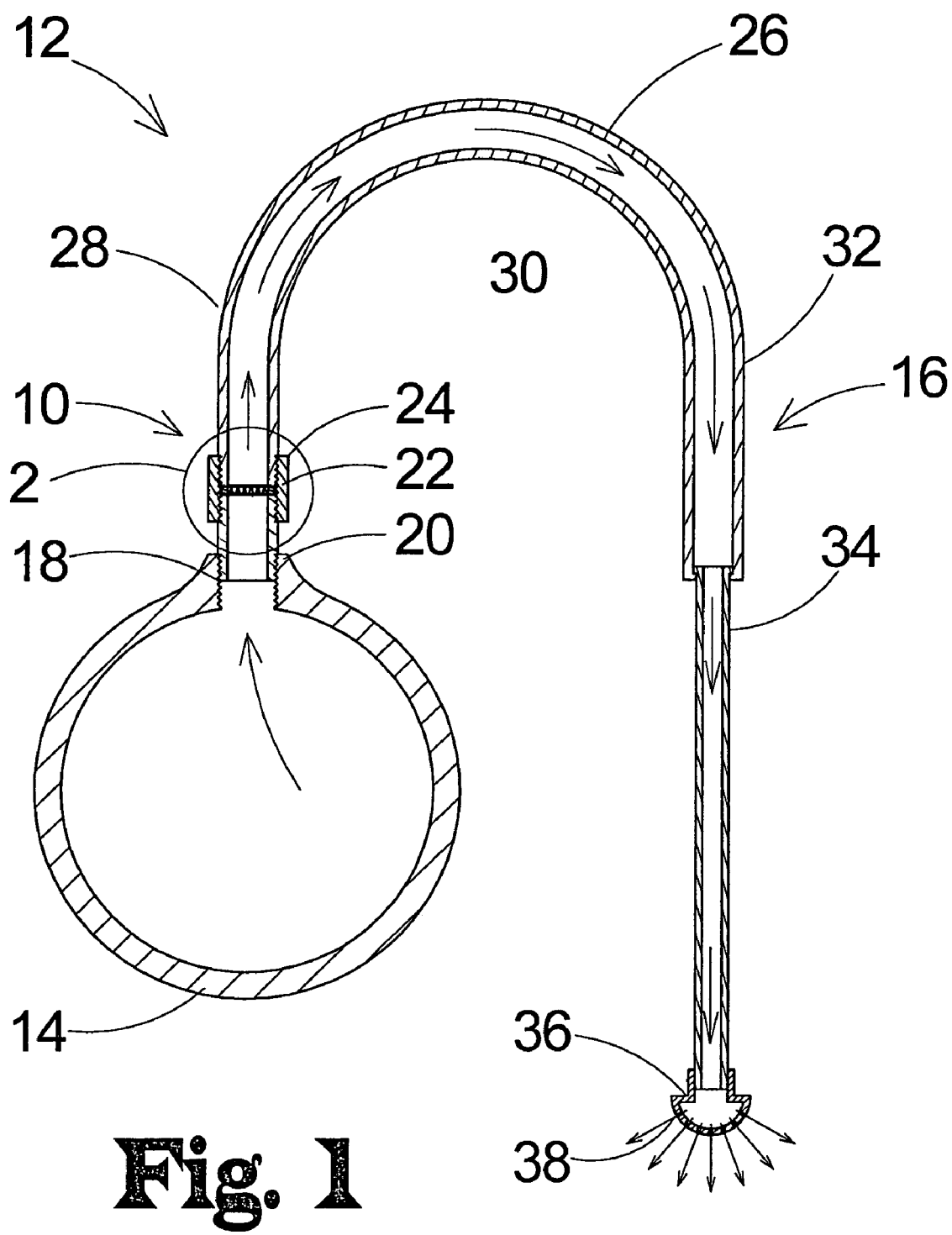
FIG. 1 is a schematic side sectional view of a portion of an illustrative irrigation system with the new filtering device according to the present invention employed thereon.

With reference now to the drawings, and in particular to FIGS. 1 through 4 thereof, a new filtering device for an irrigation system embodying the principles and concepts of the present invention will be described.

As best illustrated in FIGS. 1 through 4, a filtering device 10 of the invention is highly suitable for filtering particles from a flow of fluid in an irrigation system. An illustrative irrigation system 12 in which the filter device 10 may be employed may generally comprise a mainline pipe or conduit 14 for carrying a fluid such as irrigating water to various sprinkler assemblies 16. Each of the sprinkler assemblies 16 is associated with a tap 18 in the conduit 14 for drawing fluid from the fluid flowing through the conduit 14. The tap 18 may be located at an upper location on the wall of the conduit 14.

Each sprinkler assembly 16 of the irrigation system 12 may also include a nipple 20 may be mounted to the tap 18 on the conduit 14, and a coupler 22 may be mounted on the nipple 20 so that it is in fluid communication with the tap 18 and the conduit 14. The coupler 22 may have a lumen 24. A tube 26 may be removably coupled to the coupler 22 so that the interior of the tube 26 is in fluid communication with the lumen of the coupler 22, the nipple 20, the tap 18, and the conduit 14. In one embodiment of the irrigation system, the tube 26 has an ascending portion 28, a generally horizontal portion 30, and a descending portion 32, and may have a substantially U-shaped configuration. A drop pipe 34 may be mounted on the tube 26 at the descending portion 32 and may extend downwardly therefrom.

Each sprinkler assembly 16 of the irrigation system 12 may also include an irrigation sprinkler 36 that is in fluid communication with the drop pipe 34, the tube 26, the coupler 22, the nipple 20, and the conduit 14. The irrigation sprinkler 36 may have at least one orifice 38, and in most embodiments will have a plurality of orifices. Each of the orifices 38 may have a diameter. The diameter of the orifices may vary between sprinkler assemblies 16, and may typically range from approximately /1;16 inch to approximately /9;32 inch, although relatively larger and smaller orifice diameters may be used with the invention. In this illustrative description, orifice diameter sizes of approximately /1;16 inch, approximately /3;16 inch, and /9;32 inch will be considered.

The filter device 10 of the invention is suitably removably positioned in the lumen 24 of the coupler 22, and may be positioned between the nipple 20 and the tube 26. The filter device 10 may have an upstream side 40 for positioning in an upstream direction of the flow of fluid and a downstream side 42 for positioning in a downstream direction of the flow of fluid. The upstream side 40 and the downstream side 42 may each be substantially planar, although the sides 40, 42 are not continuous surfaces as will become apparent from the following description. The filter device 10 may have a substantially circular perimeter shape, and in one embodiment of the invention a thread 44 is formed on a perimeter edge 46 of the filter device 10 for engaging threads that are formed on an interior surface of the coupler 22. This feature of the invention permits the filter device 10 to be positively engaged and mounted on the coupler 22 at a selected position. In one embodiment of the invention, a single thread 44 extends almost completely around the perimeter edge 46 of the filter device 10, but may not extend completely about the device 10, which allows the device to be threaded into the interior of the coupler 22, but permits relatively simple molding of the device using a two piece mold structure, if desired.

The filter device 10 may comprise a perimeter rim 50 that extends along the perimeter edge 46 of the filter device 10. The perimeter rim 50 defines an opening 52, so that the perimeter rim may be substantially annular. The filter device 10 may also include a plurality of filter bars 54 extending across the opening 52 that is defined by the perimeter rim 50. Each filter bar 54 may have opposite ends that are mounted on opposite locations on the perimeter rim 50.

The plurality of filter bars 54 may be oriented substantially parallel to each other to form a plurality of slots 56 therebetween. The plurality of slots 56 may be oriented substantially parallel to each other. Significantly, in one implementation of the invention, a width of each of the slots 56 (measured at the narrowest aspect of the slot) between adjacent filter bars 54 is smaller than the diameter of the orifice 38 of the irrigation sprinkler in the system, or if different orifice sizes are employed in a sprinkler assembly 16, then the width of the slot is less than the diameter of the smallest orifice. For example, when the smallest orifice diameter for a sprinkler assembly 16 is approximately /1;16 inch, then the width of the slot 56 between the filter bars 54 may be approximately /3;64 inch or less. As another example, when the smallest orifice diameter for a sprinkler assembly 16 is approximately /3;16 inch, then the width of the slot 56 between the filter bars 54 may be approximately /5;32 inch or less. In still another example, when the smallest orifice diameter for a sprinkler assembly 16 is approximately /9;32 inch, then the width of the slot 56 between the filter bars 54 may be approximately /1;4 inch or less. Other slot widths may be implemented for other orifice diameters.

Each of the filter bars 54 of the plurality of filter bars has a transverse cross sectional shape. In one embodiment of the filter device of the invention, the transverse cross sectional shape of the filter bars 54 has a transverse width oriented toward the upstream side 40 of the filter device 10 that is relatively wider than the transverse width toward the downstream side 42 of the filter device. This characteristic of the invention facilitates flow through the filter device 10 by minimizing the extent of the path of the fluid flow that is subjected to the narrowest slot width, while permitting the depth of the filter bar 54 (e.g., between the upstream 40 and downstream 42 sides of the filter device) to be sufficiently large to assure that the filter bar is strong enough to withstand the pressure exerted against the bars by the fluid flow.

Figure 2:
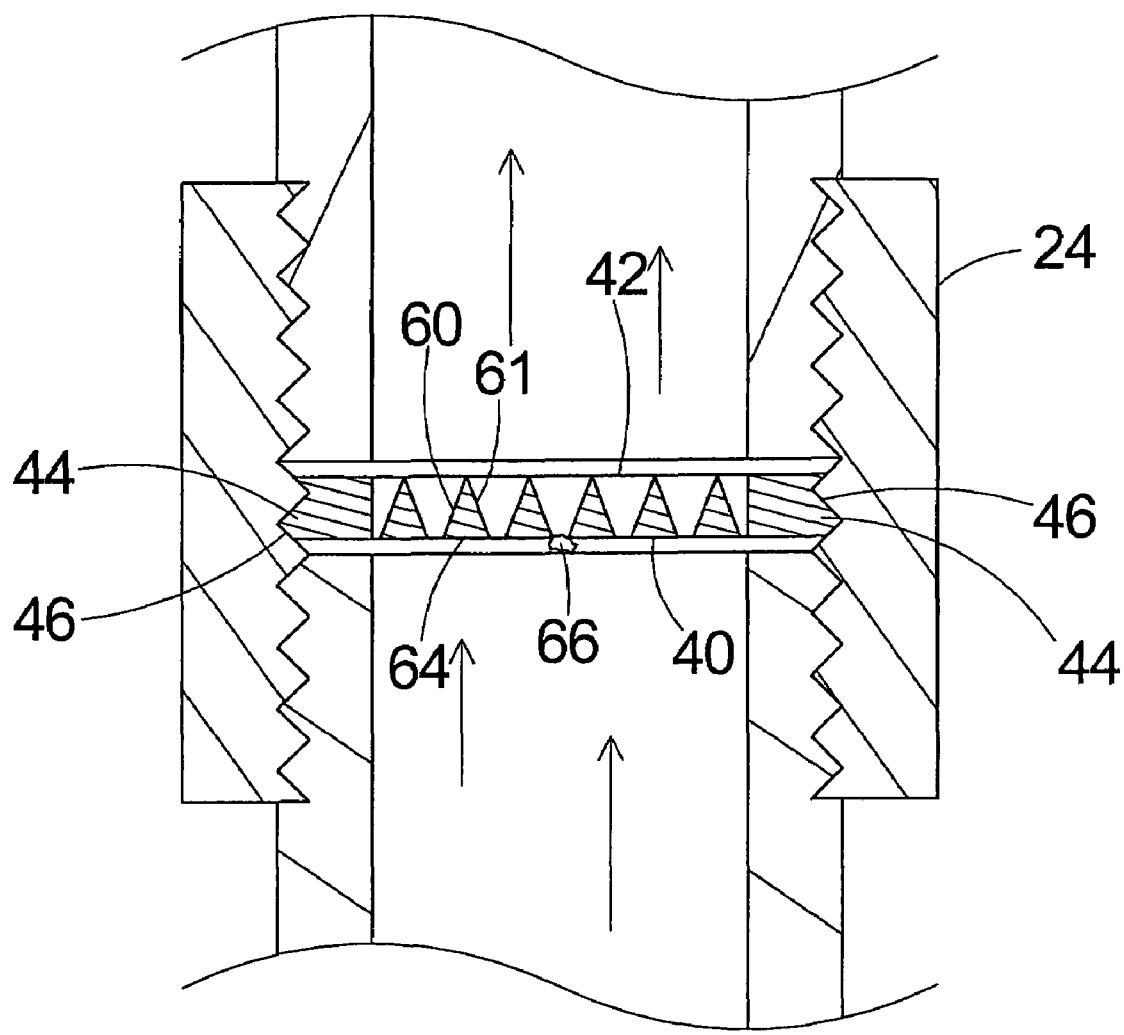
FIG. 2 is a schematic section view of the area of FIG. 1 demarcated by the circle labeled as "2", that shows an enlarged view of the filtering device of the present invention.

The transverse cross sectional shape of each of the filter bars 54 may have a pair of side surfaces 60, 61 (see FIG. 2). As a further refinement in some embodiments of the invention, the side surfaces 60, 61 of the cross sectional shape may converge toward the downstream side 42 of the filter device 10 and may diverge toward the upstream side 40 of the filter device. This characteristic also may make it less likely that particles in the fluid flow may become lodged between the filter bars 54, especially as compared to a design in which the sides converge toward the upstream side of filter device. As a still further refinement, the transverse cross sectional shape of each of the filter bars may be substantially triangular, with a base side 64 of the transverse cross section being oriented substantially perpendicular to the direction of fluid flow.

Illustratively, the filter device 10 may be molded from a relatively hard plastic material, although other materials and forming methods may be used.

A significant advantage of the invention in use is the positioning of the filter device 10 in the ascending section of the path of fluid flow (see FIG. 1), especially in combination with the characteristics of the plurality of filter bars 54 described above. As fluid moves through the filter device, particles (such as illustrative particle 66 in FIG. 2) is moved by the fluid flow against the filter device 10, and may remain against the filter device as the fluid flow continues to push (or lift) the particle against the filter device. When the fluid flow is discontinued, even if fluid remains in the conduit 14 and the nipple 18, gravity acting on the particle 66 will tend to move the particle away from the filter device in a downward direction and back toward the conduit 14 (see FIG. 1). Any returning fluid flow in the ascending portion 28 of the tube 26 can also help to clear the filter device 10. The filter device 10 in the irrigation system 12 thus tends to be self cleaning or clearing at each occasion that the fluid flow is stopped or significantly decreased, and reduces, if not eliminates, the need to disassemble the sprinkler assembly and remove the filter device for cleaning.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A filtering system for filtering particles from a flow of fluid, comprising:
 a filter device for removably positioning in a lumen of a pipe carrying the flow of fluid, the filter device having an upstream side for positioning in an upstream direction of the flow of fluid and a downstream side for positioning in a downstream direction of the flow of fluid, the filter device comprising:
   a perimeter rim extending along the perimeter edge of the filter device and defining an opening; and
   a plurality of filter bars extending across the opening defined by the perimeter rim to form a plurality of slots therebetween;
   wherein each of the filter bars of the plurality of filter bars has a transverse cross sectional shape, the transverse cross sectional shape having a transverse width toward the upstream side of the filter device that is relatively wider than the transverse width toward the downstream side of the filter device.

2. The filter system of claim 1 wherein the transverse cross sectional shape of each of the filter bars has a pair of side surfaces, the side surfaces of the cross sectional shape converging toward the downstream side of the filter device and diverging toward the upstream side of the filter device.

3. The filtering system of claim 1 wherein the transverse cross sectional shape of each of the filter bars is substantially triangular.

4. The filtering system of claim 1 wherein the filter device additionally comprises a thread being formed on a perimeter edge of the filter device.

5. The filtering system of claim 4 additionally comprising:
 a coupler having a lumen, at least a portion of an interior surface of the lumen being threaded;
 wherein the filter device is threaded into the lumen of the coupler.

6. The filtering system of claim 1 wherein the filter device has a substantially circular perimeter shape.

7. The filtering system of claim 1 wherein the plurality of filter bars are oriented substantially parallel to each other and the plurality of slots are oriented substantially parallel to each other.

8. The filtering system of claim 1 additionally comprising:
 an irrigation sprinkler in fluid communication with the filter device, the irrigation sprinkler having at least one orifice with a diameter;
 wherein a width between each of the filter bars of the plurality of filter bars is smaller than the diameter of the orifice of the irrigation sprinkler.

9. The filter system of claim 1 wherein the transverse cross sectional shape of each of the filter bars has a pair of side surfaces, the side surfaces of the cross sectional shape converging toward the downstream side of the filter device and diverging toward the upstream side of the filter device;
 wherein the transverse cross sectional shape of each of the filter bars is substantially triangular;
 wherein the filter device additionally comprises a thread being formed on a perimeter edge of the filter device;
 wherein the filter device has a substantially circular perimeter shape;
 wherein the plurality of filter bars are oriented substantially parallel to each other and the plurality of slots are oriented substantially parallel to each other;
 an irrigation sprinkler being in fluid communication with the filter device, the irrigation sprinkler having at least one orifice with a diameter, wherein a width between each of the filter bars of the plurality of filter bars is smaller than the diameter of the orifice of the irrigation sprinkler; and
 a coupler having a lumen, at least a portion of an interior surface of the lumen being threaded, wherein the filter device is threaded into the lumen of the coupler.

\* \* \* \* \*